United States Patent [19]
Maroschak

[11] 3,877,831
[45] Apr. 15, 1975

[54] METHOD OF APPARATUS FOR DRILLING HOLES IN TUBES

[76] Inventor: Ernest J. Maroschak, Box 878, Roseboro, N.C. 28382

[22] Filed: Sept. 1, 1972

[21] Appl. No.: 285,921

Related U.S. Application Data

[63] Continuation-in-part of Ser. No. 262,192, June 13, 1972, Pat. No. 3,819,778.

[52] U.S. Cl. .................. 408/32; 83/54; 83/660; 408/35; 408/44
[51] Int. Cl. .................. B23b 39/20; B23b 41/00
[58] Field of Search .................. 408/32, 35, 44, 55; 29/33 T; 83/15, 22, 168, 169, 170, 54, 660

[56] References Cited
UNITED STATES PATENTS
| | | | |
|---|---|---|---|
| 708,177 | 9/1902 | Sherman | 408/35 X |
| 3,620,115 | 11/1971 | Zieg et al. | 83/660 X |
| 3,759,123 | 9/1973 | Van Zon | 83/54 |

*Primary Examiner*—Andrew R. Juhasz
*Assistant Examiner*—Z. B. Bilinsky
*Attorney, Agent, or Firm*—Parrott, Bell, Seltzer, Park & Gibson

[57] ABSTRACT

Concurrently with or after the forming of a tube, such as a corrugated plastic tube, the tube is fed through a drilling station where one or more longitudinal rows of holes are drilled in the wall of the tube by means of a corresponding number of rotating drill bits. In a specific sense, the drilling station includes a separate drilling head for forming each row of holes, with a circular series of angularly spaced rotating drilled bits on each drilling head, and wherein each of the drilling heads is rotated in timed relation to the movement of the tube so as to drill holes therein without interrupting or retarding movement of the tube.

13 Claims, 14 Drawing Figures

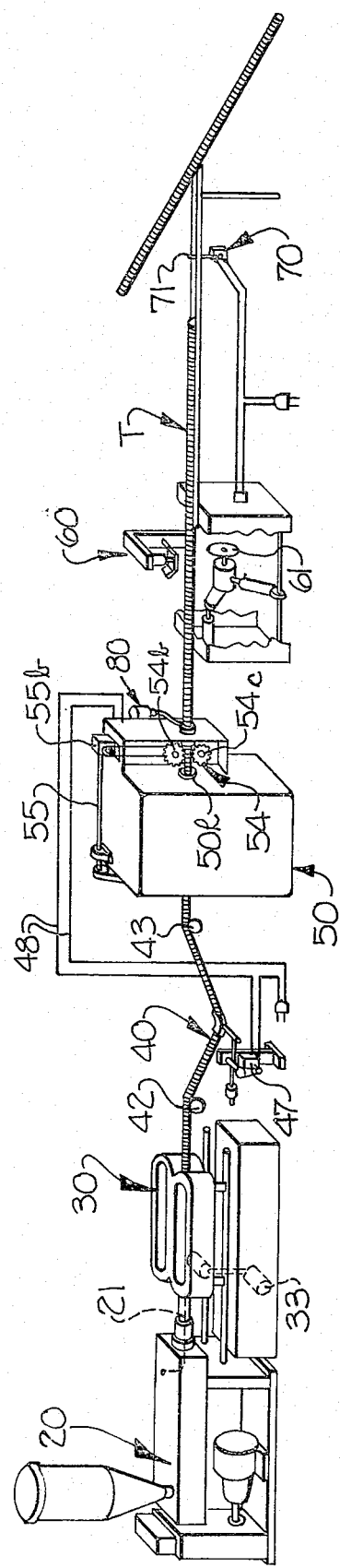

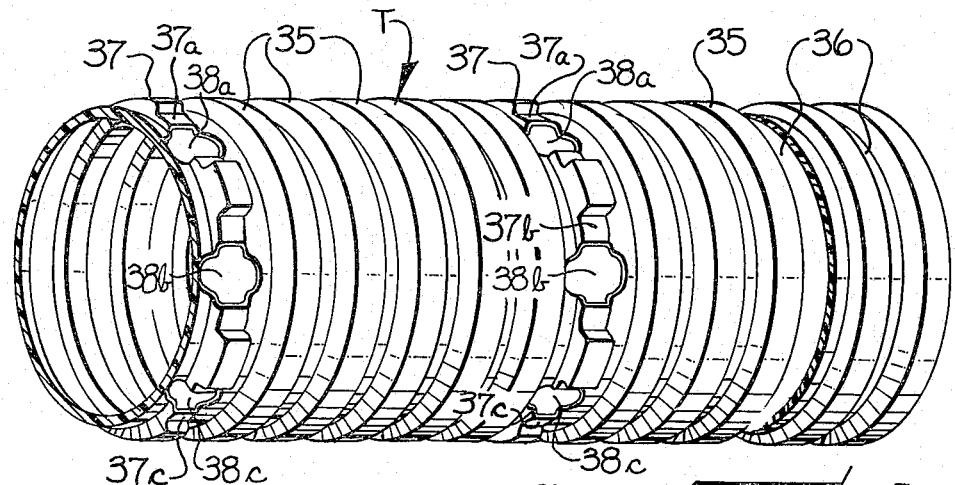
Fig-4
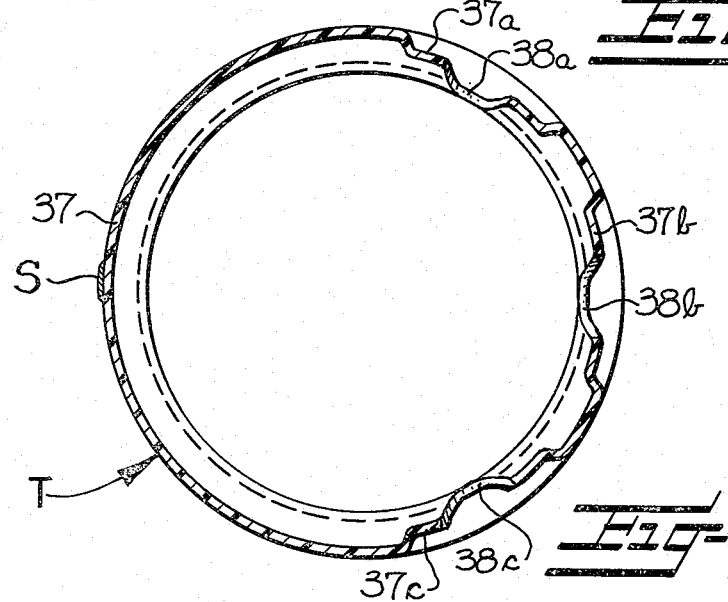
Fig-5
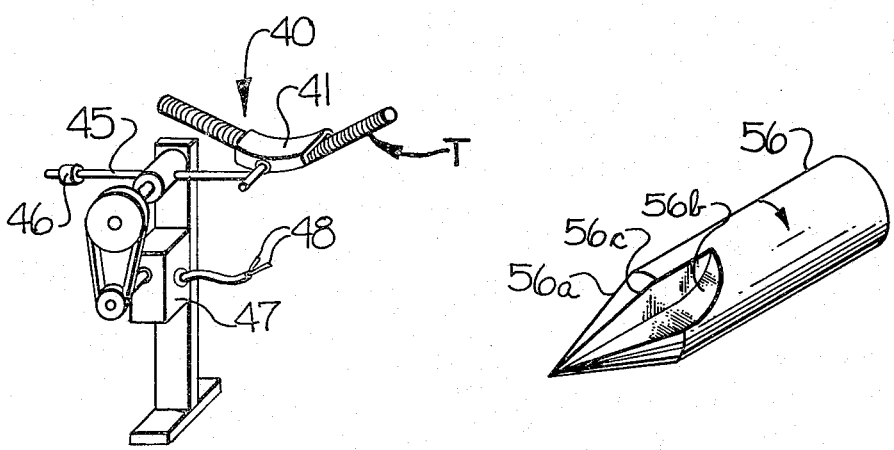
Fig-6
Fig-7

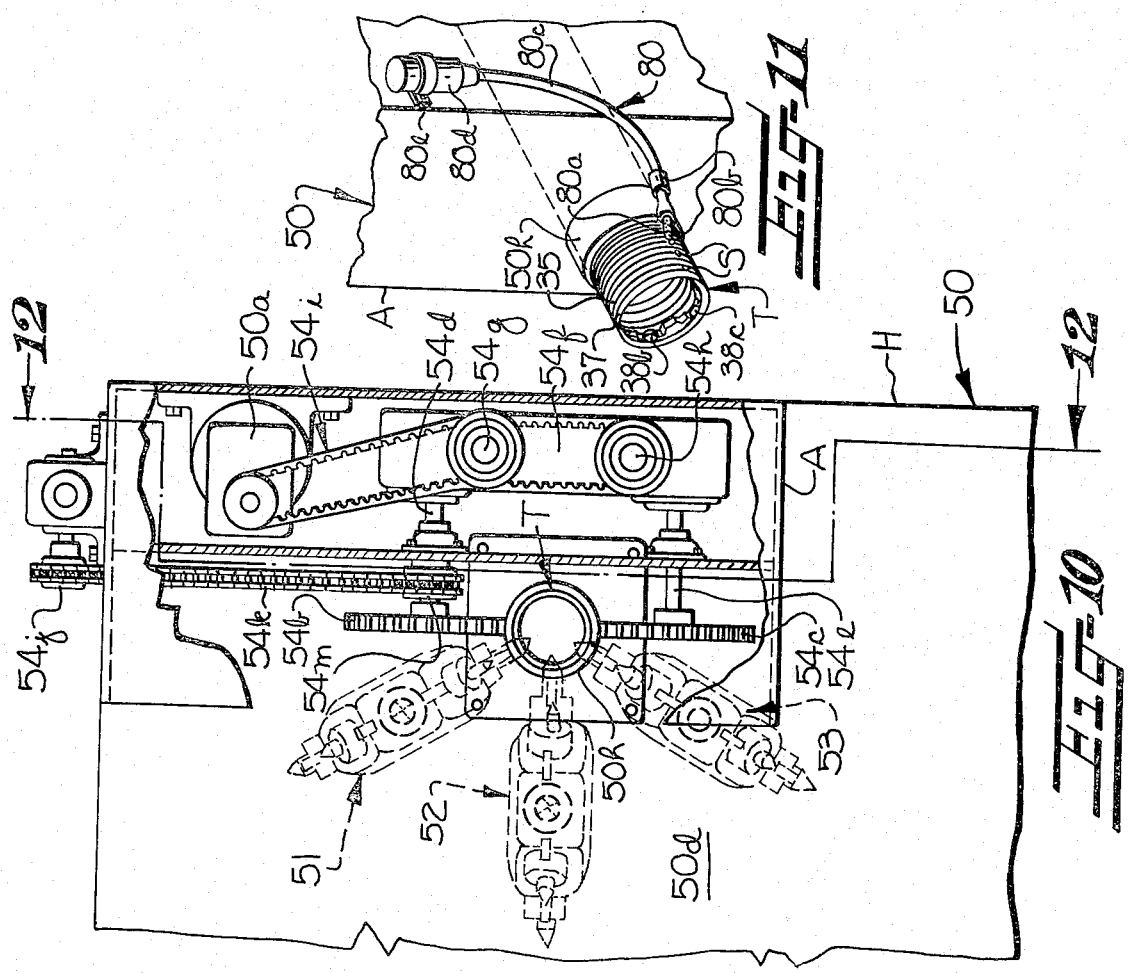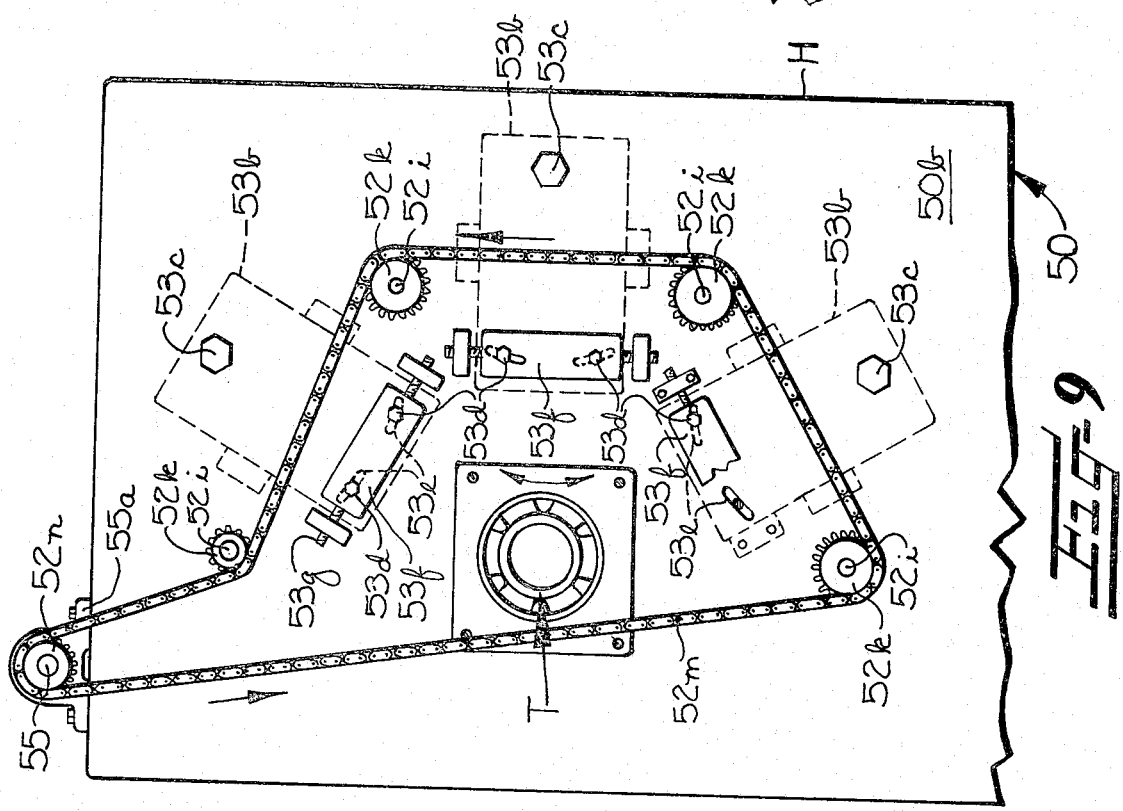

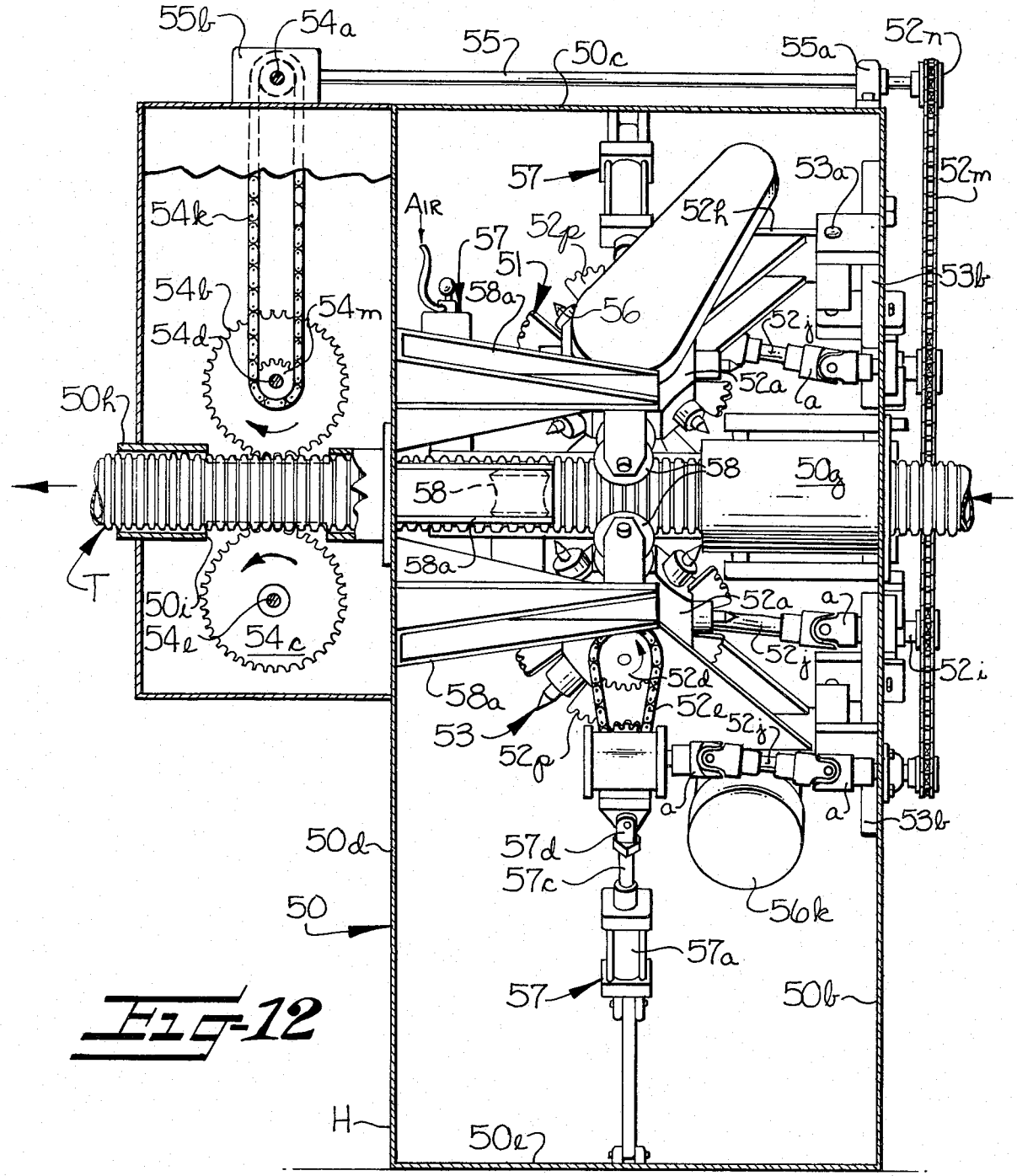

METHOD OF APPARATUS FOR DRILLING HOLES IN TUBES

This application is a continuation-in-part of my copending application Ser. No. 262,192, U.S. Pat. No. 3,819,778 filed June 13, 1972, and entitled METHOD OF MAKING AND PROCESSING CORRUGATED PLASTIC PIPE.

This invention relates to an improved method and apparatus for forming longitudinal rows of spaced holes in elongate members and especially in corrugated plastic tubes such as are particularly useful in underground drainage systems and septic tank fields.

It is the primary object of this invention to provide an improved method and apparatus for drilling holes in a continuously moving elongate member, such as a tube, so as to facilitate a highly efficient and high rate of production of such elongate member with a longitudinal row or rows of drilled holes therein.

It is another object of this invention to provide a method and apparatus for drilling holes in a resilient plastic corrugated tube, and wherein the tube is fed through a drilling station, and the operation of rotating drill bits of the drilling station is so correlated to the rate of feed of the tube as to insure that successive holes are drilled at predetermined spaced corrugations of the tube.

It is still another object of this invention to provide a method and apparatus for making and drilling holes in a plastic corrugated tube in a continuous operation, wherein a tube of hot plastic material is extruded into and directed through a corrugated blow molding zone to form annular corrugations thereon, concurrently with which the tube is fed downstream of the molding zone through a drilling station where one or more longitudinal rows of holes are drilled in the tube as the corrugated tube is fed from the drilling station through a cutting station and cut into predetermined lenghts.

Some of the objects and advantages of the invention having been stated, other objects will appear as the description proceeds when taken in connection with the accompanying drawings, in which --

FIG. 1 is a schematic perspective view of a preferred arrangement of apparatus for carrying out the method of this invention;

FIG. 2 is a fragmentary top plan view illustrating a corrugated plastic tube being delivered from the blow molding machine;

FIG. 3 is a somewhat schematic side elevation of the turret drill heads and tube feeding means of the improved drilling station 50 and showing a portion of the corrugated plastic tube passing through the drilling station;

FIG. 4 is an enlarged fragmentary view of a portion of the corrugated plastic tube as formed by the molding machine of FIG. 1, and showing arcuate series of drilled holes in the interrupting recesses of certain ribs of the tube;

FIG. 5 is an enlarged transverse sectional view through an interrupted rib of the corrugated tube of FIG. 4 and showing a preferred arrangement of the series of three arcuately or angularly spaced drilled holes through the wall of the corrugated tube;

FIG. 6 is an enlarged fragmentary perspective view of the speed control or tube tension sensing means shown in the central portion of FIG. 1;

FIG. 7 is an enlarged view of a preferred form of drill bit used on the turret drill heads of the drilling station or machine;

FIG. 9 is a fragmentary rear or ingress end elevation of the drilling machine taken substantially along line 9—9 in FIG. 8;

FIG. 10 is a fragmentary front or egress end elevation of the drilling machine, taken substantially along line 10—10 in FIG. 8, with portions broken away;

FIG. 11 is a fragmentary perspective view of a portion of the auxiliary housing A at the front end of the drilling machine, and showing a tube marking means thereon;

FIG. 12 is a left-hand side elevation of the mechanisms within the main housing of the drilling machine, with portions broken away and being taken substantially along line 12—12 in FIG. 10;

Figure 8:
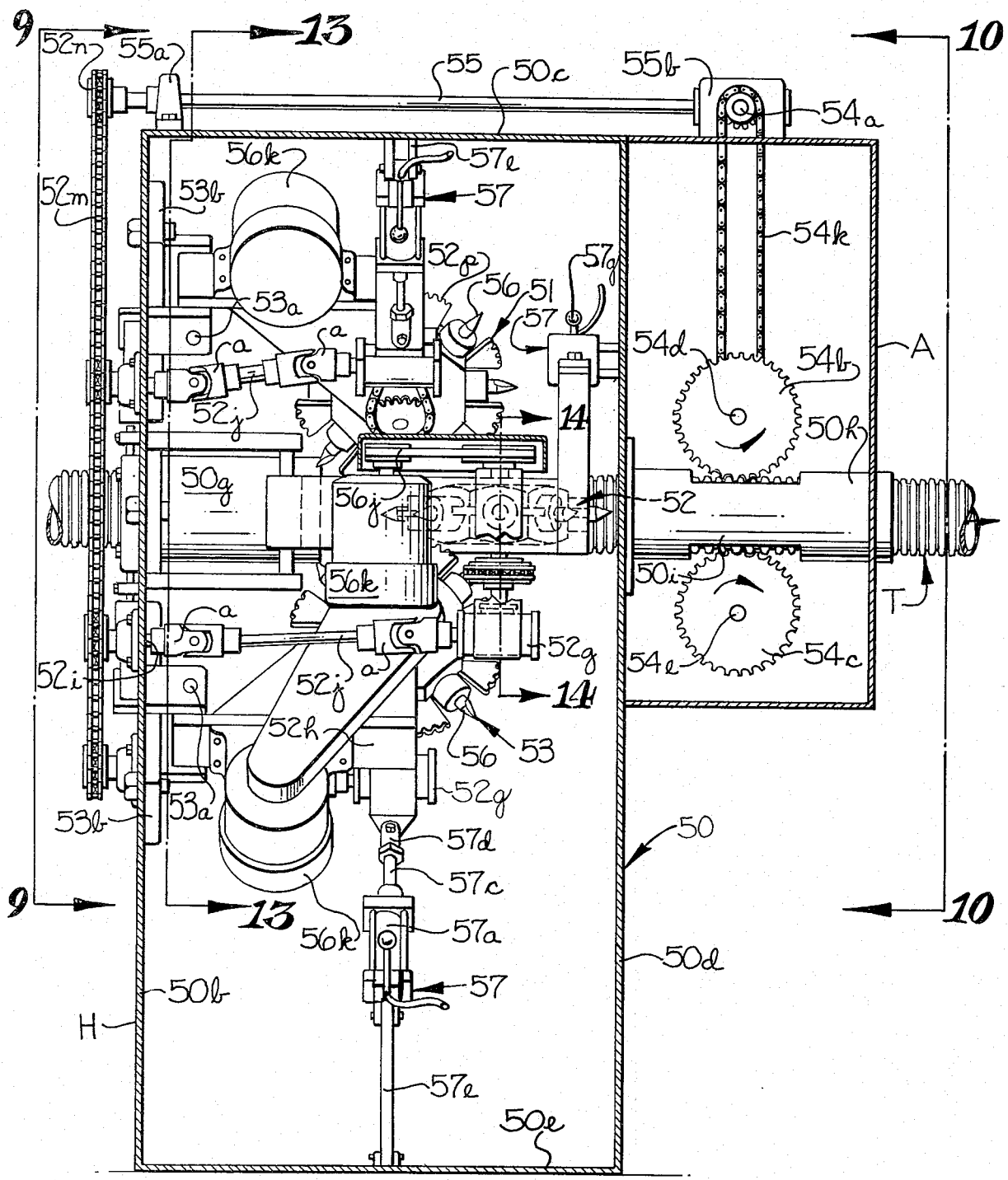
FIG. 8 is a side elevation, partially in section, looking at the right-hand side of the drilling machine, but omitting the right-hand wall of the main housing thereof for purposes of clarity.
Figure 13:
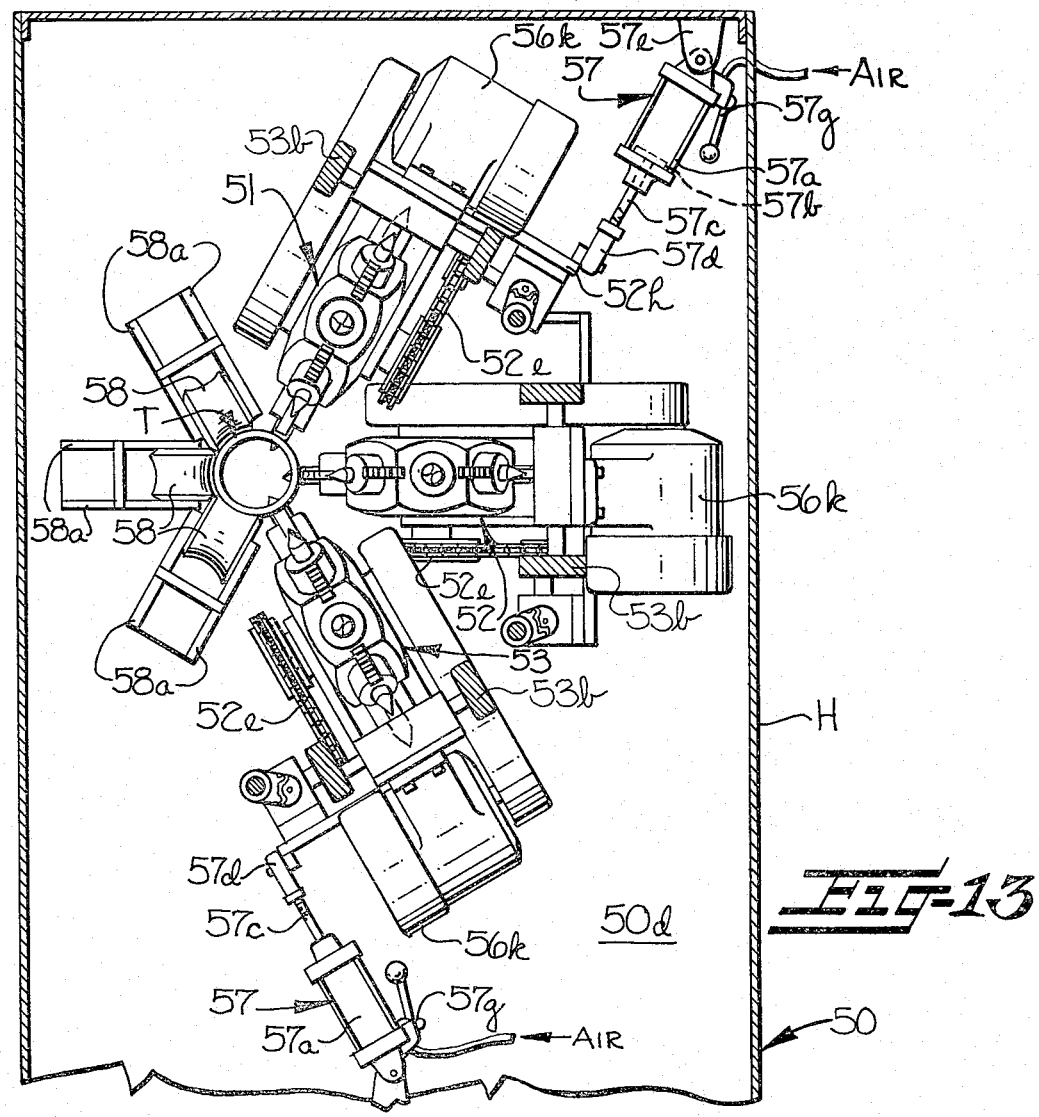
Figure 14:
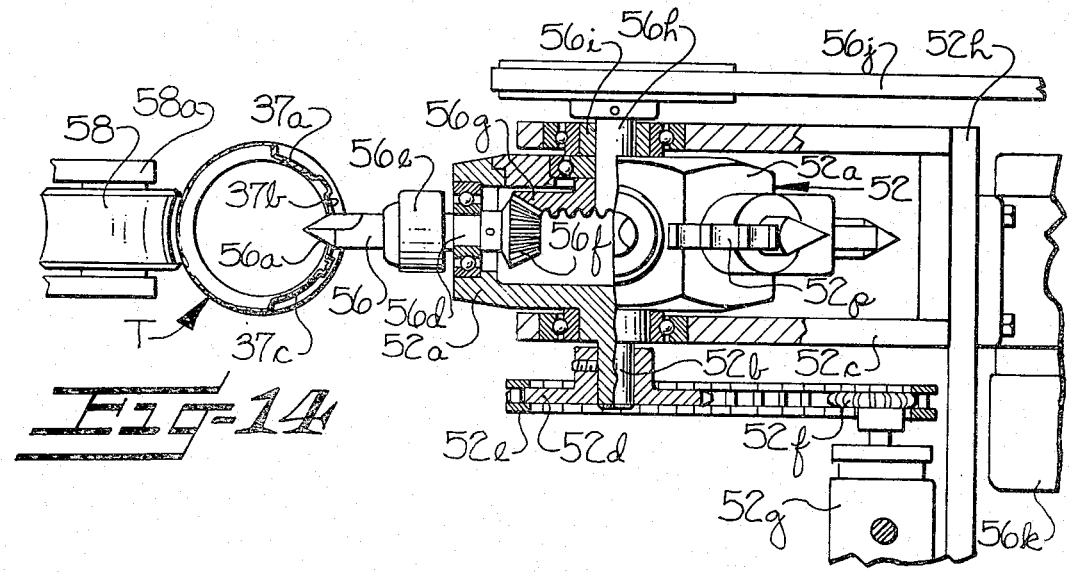

FIG. 13 is a fragmentary vertical sectional view, mostly in elevation, taken looking forwardly substantially along line 13—13 in FIG. 8; and FIG. 14 is an enlarged fragmentary vertical sectional view taken substantially along line 14—14 in FIG. 8 and showing one of the turret drill heads partially in section and partially in elevation, with one of the drill bits thereof in drilling engagement with the corrugated plastic tube.

Referring more specifically to the drawings, as shown in FIGS. 1 and 2, an extruding machine 20 is arranged to continuously extrude and feed a tube of hot plastic material into a blow molding machine or corrugator broadly designated at 30. Blow molding machine 30 is of a well-known type which successively forms annular corrugations on the tube being extruded from machine 20 as the tube is received in an elongate blow molding zone formed by a plurality of pairs of cooperating substantially semitubular mold sections or die blocks arranged in end-to-end relation in each of two opposing series. The die blocks in one series are each indicated at 31 and the die blocks in the other series are each indicated at 32 (FIG. 2). Conventional drive means, shown schematically at 33 in FIG. 1, is provided for moving the two series of die blocks along respective endless paths with the proximal runs or reaches of such paths extending in, and moving forwardly along, a substantially straight path aligned with the nozzle of extruding machine 20 and defining the blow molding zone in the machine 30.

As is well-known, die blocks 31, 32 move forwardly together along the molding zone where they are formed into the cooperating pairs with each cooperating pair forming a single mold cavity and with the cavities of all the die blocks 31, 32 in the molding zone forming an elongate composite mold cavity having annular corrugations of alternating ribs and valleys therealong for forming respective valleys and ribs defining the wall of the corrugated tube being formed. In this regard, the corrugated plastic tube being molded by molding machine 30 preferably takes the form of the tube, broadly designated at T, best shown in FIGS. 4 and 5, wherein the ribs and valleys of tube T are respectively designated at 35, 36.

Although not limited thereto, the invention is particularly concerned with the drilling of holes in corrugated plastic tubes such as are used for underground drainage systems or septic tank fields. Accordingly, it is preferred that die blocks 31, 32 of FIG. 2 are constructed and arranged in the manner of the die blocks dislcosed in my copending application Ser. No. 261,780, filed June 12, 1972, and entitled CONVERTED CORRUGATED PIPE MOLDING MACHINE AND METHOD OF OBTAINING SAME, with particular reference to FIGS. 12 and 13 thereof. The die blocks of the last-mentioned copending application are so constructed and arranged that certain substantially uniformly spaced ribs; i.e., every sixth rib in this instance, are interrupted as they are molded in the molding machine 30. This interrupted nature of such certain ribs, each of which is indicated at 37 in FIG. 4, forms interrupting recessed surfaces or plateaus at spaced intervals around the ribs 37. There are three recessed surfaces or plateaus 37a, 37b, 37c at spaced intervals around each interrupted rib 37, with the outer surfaces of the plateaus 37a–37c being disposed at a level intermediate the level of the outer surfaces of adjacent ribs and valleys 35, 36. Such recessed surfaces or plateaus 37a–37c are particulary desirable in plastic corrugated tubes which are to be provided with drainage holes therein, since the drainage holes may be formed through the plateaus and, when the tube T is installed in a ditch with the centermost row of holes facing downwardly, the holes may be shielded by higher surfaces of the same ribs and by adjacent uninterrupted ribs 35 during the back-filling operations attendant to installation of underground drainage systems or septic tank fields.

In this instance, it will be observed in FIGS. 4 and 5 that the drainage holes formed through plateaus 37a, 37b, 37c of each interrupted rib 37 are respectively designated at 38a, 38b, 38c and are substantially round. As preferred, each drainage hole is of a greater diameter than the plateau through which it extends, but of lesser diameter than the collective width of a rib and two valleys. Also, it is preferred that each plateau 37a–37c is of greater length than the diameter of the respective holes 38a–38c and that the intersecting planes of the axes of adjacent drainage holes 38a–38c define an included angle of about 60° therebetween. Thus, all three of the holes 38a–38c in each interrupted rib 37 are disposed adjacent the same side of the tube with relatively short arcuate dividing rib segments separating the centermost plateau 37b from the two outermost plateaus 37a, 37c. Also, the two outer plateaus 37a, 37c are separated by a relatively large rib segment having an arcuate extent encompassing at least one-half of the diameter of the tube, and opposite ends of the large segment terminate at the two outer plateaus 37a, 37c.

Corrugated tubes used for underground drainage systems or septic tank fields in the United States usually have a nominal diameter of at least about 4 inches and it is preferred, therefore, that each drainage hole 38a–38c has a diameter of about ½ to ¾ inch. Also, it is preferred that the drainage holes are angularly spaced apart from each other in the manner heretofore described so that, when the tube is being installed, all three of the holes 38a–38c in each interrupted rib 37 will face generally downwardly so that the back-fill material will not enter the tube T through the drainage holes 38a–38c and so that the drainage holes will not be obstructed by the back-fill material.

Since the die blocks 31, 32 may be arranged and constructed in the manner disclosed in said copending application Ser. No. 261,780, and the die blocks 31, 32 are used in molding machine 30 in a conventional manner in other respects, a further detailed description thereof is deemed unnecessary. As is conventional, extruder or extruding machine 20 is provided with suitable pressure means 21 for introducing compressed air or other pressurized fluid into the tube being extruded to expand and mold the same against the corrugated wall of the composite mold cavity formed by die blocks 31, 32 in the molding zone defined thereby, so as to form the annular corrugations on the tube T as shown in FIGS. 4 and 5.

The term "annular corrugations" are used herein not only means corrugations in the form of individual circular ribs and valleys around the plastic tube, but also means spiral or helical ribs and valleys extending around and along the length of the corrugated tube. Also, as heretofore stated, some of the ribs of the corrugations may be interrupted at certain intervals. As indicated heretofore, the forwardly moving die blocks 31, 32 of molding machine 30 deliver corrugated tube T forwardly at a predetermined speed.

As shown in FIG. 1, the corrugated tube T being delivered from blow molding machine 30 successively passes through a speed control or tension sensing device 40, a drilling station or drilling machine 50, and then to a cutting station or machine 60, to be later described.

As shown schematically in FIG. 3, drilling station 50 is provided with three turret drill heads 51, 52, 53 which not only drill the respective holes 38a, 38b, 38c (FIG. 4) in tube T, but also serve as a primary positive feed means for tube T, as will be later described in detail. The primary positive feed means and a secondary positive feed means 54, associated with drilling station 50, are driven by a common electric motor 50a (FIG. 10). In view of the fact that tube T normally is in heated condition as it passes through drilling station 50 and is not entirely cool at this point in the process, it is highly desirable to avoid stretching the tube lengthwise as well as to avoid compressive shortening of the tube. To avoid these conditions, it is desirable to synchronize the speed of the aforementioned primary and secondary positive feed means with the delivery rate of corrugated tube T emerging from blow molding machine 30. This permits obtaining a final tube product having a substantially uniform number of ribs and valleys per unit length thereof.

Accordingly, the speed of electric motor 50a (FIG. 10) is varied according to variations in tension in the tube, in its course from molding machine 30 to drilling station 50, by means of the speed control or tension sensing device 40. As best shown in FIG. 6, speed control 40 comprises a feeler element 41, preferably in the form of a relatively short, arcuate channel member, engaging tube T at a point between molding machine 30 and drilling station 50. Feeler element 41 rests on tube T between a pair of spaced tube supporting rollers or members 42, 43 (FIG. 1). Feeler element 41 is mounted on one end of a pivotally mounted conterbalance arm 45 having an adjustably mounted counterbalance weight 46 on the other end thereof. A potentiometer or rheostat 47 is electrically connected to motor 50a (FIG. 10) by suitable electrical conductors 48 (FIG. 1). Also, rheostat 47 is operatively connected to counterbalance arm 45 so as to be driven thereby, such that potentiometer 47 is varied in accordance with the position of counterbalance arm 45. Thus, in the event that the tension in tube T increases, this results in lifting of sensing element 41 to reduce the speed of motor 50a and decrease the speed of the positive feed means to be later described. Conversely, if tube T becomes unduly slackened and the tension therein drops to a predetemined minimum permitting sensing element 41 to move to a relatively lowered position, potentiometer 47 will increase the speed of motor 50a and increase the rate of feed of the positive feed means.

As heretofore indicated, cutting station 60 is positioned downstream of drilling station 50. As shown, cutting station 50 includes a motoroized saw 61 actuated under control of a sensing switch 70 positioned a predetermined distance downstream from cutting station 60. Sensing switch 70 has a switch sensing arm 71 which protrudes upwardly through a tube guide trough 72 into the path of travel of the leading end of tube T. Upon the leading end of tube T engaging switch sensing arm 71, switch 70 is closed to actuate motorized saw 61. It follows, therefore, that saw 61 severs tube T into predetemined lengths in response to predetemined linear movements of tube T forwardly of molding machine 30. As is conventional, motorized saw 61 is mounted for forward movement with the tube during the cutting operation and, upon the cutting being completed, saw 61 is moved upstream to its original location ready for the next cutting operation.

The improved drilling machine for carrying out the method of this invention will now be described in detail.

As described earlier herein, drilling machine 50 comprises three turret drill heads 51, 52, 53. These drill heads are disposed in different angular positions relative to each other and relative to the substantially straight path of travel of tube T through drilling machine 50 in accordance with the desired angular spacing between the three rows of holes 38a, 38b, 38c to be drilled in tube T (FIG. 4). Also, the rotational axis of the turret drill casing 52a of drill head 52 is spaced a predetermined distance forwardly of the planes of the rotational axes of the turret casings of drill heads 51, 53 so that the turret drill heads 51, 53 drill holes in the tube as the successive interrupted ribs 37 pass through a first zone of drilling station 50, and the turret drill head 52 drills holes in the successive interrupted ribs 37 as they pass through another or second zone of the drilling station fordwardly of the first drilling zone.

As best shown in FIG. 10, the planes of the axes of casings 52a of turret drill heads 51, 53 define an acute angle of about 60°, and the plane of the substantially vertical axis of casing 52a of turret drill head 52 intersects the plane of the rotational axis of the casing of each outer turret head at an obtuse angle of about 120°. Thus, the median transverse planes of the turret casings 52a of outer turret drill heads 51, 53 (where the deepest penetration of the drill bits into the tube T occurs) are positioned substantially less than 180° apart about the path of travel of tube T. In other respects turret drill heads 51, 52, 53 are quite similar to each other and, therefore, front drill head 52 will be described in detail, with particular reference to FIG. 14, and like parts associated with drill heads 51, 53 will bear the same reference characters, where applicable.

As shown in FIG. 14, casing 52a is of hollow construction and one end wall thereof is provided with a hub 52b journaled in one arm of an adjustable bifurcated bracket 52c. The reduced outer end portion of hub 52b has a sprocket wheel 52d thereon driven by an endless sprocket chain 52e engaging the same and also engaging a sprocket wheel 52f secured on the output shaft of a suitable gear box 52g. Gear box 52g is mounted on a motor base plate 52h to which bifurcated bracket 52c is suitably secured.

The input portion of gear box 52g (FIG. 8) is connected to a substantially horizontal stub shaft 52i by means of a connecting rod or shaft 52j having universal joints a on opposite ends thereof so that drill head 52 may be adjusted inwardly and outwardly toward and away from the path of travel of tube T through drilling machine 50 as will be later described. As best shown in FIGS. 8 and 12, all three shafts 52i are suitably journaled in the stationary rear wall 50b of a main housing H of drilling machine 50. Each of the three stud shafts 52i has a sprocket wheel 52k fixed on the rear end portion thereof (FIGS. 8, 9, and 12), and sprocket wheels 52k are engaged by a common endless sprocket chain 52m engaged and driven by a sprocket wheel 52n.

Sprocket wheel 52n is fixed on the rear end of a rearwardly extending drive shaft 55 whose rear portion is journaled in a bearing 55a mounted on the upper wall 50c of main housing H. The front portion of drive shaft 55 is journaled in and serves as an output portion of a suitable gear box 55b mounted on the upper wall of an auxiliary housing A. Housing A is substantially smaller than main housing H and is carried by main housing H. Electric motor 50a (FIG. 10) drives the input portion 54a of gear box 55b in a manner to be described, thus transmitting rotation to drive shaft 55.

Referring again to FIG. 14, it will be observed that the turret casing there shown serves as carrier means for a circular series of spaced apart radially projecting drill bits 56, there being eight of the drill bits 56 in the series (FIG. 3). Since each turret casing 52a rotates on its own axis during operation of drilling station 50, it follows that each series of drill bits 56 moves about a common orbital axis in a substantially circular orbital path. Also, the orbital axis of each turret casing 52a is so positioned relative to the path of travel of tube T that the arcuate path of each successive drill bit 56 intercepts the path of travel of tube T. Thus, each successive drill bit 56 moves into and then out of the path of travel of tube T to drill a corresponding hole in the relatively thin wall of tube T as casing 52a is rotated about an axis offset from but extending substantially normal to the path of travel of tube T.

Each drill bit 56 has an elongate substantially conical pointed working end 56a whose included angle may be about 60°, and a portion of which is interrupted or grooved longitudinally, as at 56b (FIG. 7), so as to provide a cutting edge 56c on the substantially conical working end 56a of each drill bit 56. Groove 56b provides a channel extending into the shank of the drill bit for ejection of shavings or residue of the plastic material being cut away from tube T during the drilling operation of each successive drill bit 56. It is preferred that the rotational axis of casing 52a in FIG. 14 is so spaced from the path of travel of tube T that, as each successive drill 56 reaches fully operated position with its axis extending perpendicular to the path of travel of tube T, the desired size of hole will be formed in the wall of the tube T with the entire length of the conical working end 56a of the corresponding drill bit 56 projecting into tube T as shown in FIG. 14.

Each drill bit 56 is removably connected to a spindle 56d by means of a conventional drill chuck 56e. Each spindle 56d is journaled in and projects into casing 52a, where it has a planetary beveled gear 56f fixed thereon and meshing with a beveled sun gear 56g common to all of the planetary gears 56f in that casing 52a. Sun gear 56g is mounted on the inner end of a stub shaft 56h which extends through a hub 56i journaled in one of the arms of bifurcated bracket 52c and also journaled in the adjacent end wall of casing 52a remote from hub 52b. Thus, it is apparent that shaft 56h may be rotated independently of casing 52a of each turret drill head 51–53.

Each shaft 56h is driven by suitable belt and pulley connections 56j (FIGS. 8 and 14) connecting the same to an individual electric motor 56k suitably secured to the surface of the corresponding motor base plate 52h (FIG. 14) opposite from bifurcated bracket 52c. As best shown in FIGS. 8 and 12 each motor base plate 52h extends rearwardly of the respective bifurcated bracket 52c with respect to each respective casing 52a, and the rear end of each plate 52h is pivotally mounted, as at 53a, between the inwardly projecting distal portions of a respective main turret supporting bracket 53b.

In order to facilitate accurate adjustment of each drill head 51–53 so that any innermost or active drill bits 56 thereof are properly aligned with the respective plateaus 37a, 37b, 37c of successive interrupted ribs 37 (FIGS. 4, 5, and 14), a portion of each bracket 53b remote from the path of travel of tube T through drilling machine 50 is pivotally mounted, as at 53c (FIG. 9), on the inner surface of the rear wall 50b of main housing H. Additionally, the inner end portion of main turret brackets 53b are secured to wall 50b by bolts 53d which penetrate respective adjustment slots 53e formed in wall 50b and also extend through back-up plates 53f. Opposite ends of each back-up plate 53f are engaged by respective adjustment screws 53g threadedly mounted in suitable projections on the outer surface of rear wall 50b. It is apparent that adjustment screws 53g may be adjusted to vary the position of the inner portion of each main turret supporting bracket 53b about the respective pivot 53c and thereby to adjustably vary the position of any then innermost drill bit 56 laterally of the tube path through drilling machine 50.

In order to move turret drill heads 51–53 toward and away from the path of travel of tube T through drilling machine 50 so as to move the drill heads into and out of operative position, a double-acting fluid operated ram 57 is connected to each motor base plate 56h remote from its pivot 53a (FIGS. 8, 12 and 13). Each ram 57 is shown in the form of a cylinder 57a having a piston 57b therein from which a piston rod 57c extends. The end of each piston rod 57c remote from cylinder 57a is pivotally connected to the corresponding motor base plate 52h by means of a cuff member 57d threaded onto the outer end of the corresponding piston rod 57c so as to facilitate adjustment of the effective length of each piston rod 57c.

The end of cylinders 57a remote from piston rods 57c are pivotally connected to suitable support brackets 57e. The support brackets 57e associated with the respective turret drill heads 51–53 are suitably secured to top wall 50c, front wall 50d and bottom wall 50e (FIGS. 8 and 12) of main housing H. Each cylinder 57a has a suitable manually operable four-way valve 57g thereon through the medium of which a suitable source of fluid under pressure, not shown, such as compressed air, is connected to doubleacting rams 57.

Each four-way valve 57g may be of any conventional type which will, upon movement of its control handle in one direction, introduce fluid pressure into the outer end of the corresponding cylinder and which, upon movement of its control handle in the opposite direction will introduce fluid pressure into the inner end of the corresponding cylinder. Accordingly, a further more detailed description of the rams 57 and the control valves 57g therefore is deemed unnecessary.

It is apparent that, upon fluid pressure being introduced into the ends of cylinders 57a remote from drill heads 51–53, the drill heads will be moved inwardly to a predetermined operative position determined by the effective length of the respective piston rods 57c. Conversely, when the machine is shut down for repairs or for any other purpose, the valves 57g may be manipulated to introduce fluid pressure into the inner ends of the cylinders 57a, adjacent the respective turret drill heads 51–53, to withdraw the drill heads to an inoperative position so that the drill bits 56 thereon are withdrawn completely out of the path of travel of tube T. It is to be noted that, if the holes 38a–38c (FIGS. 4 and 5) to be formed in tube T by any one or more of the series of drill bits 56 of the respective turret drill heads 51–53 are to be of less diameter than the shanks of the drill bits, the effective lengths of the respective piston rods 57c may be adjusted so that the depth of penetration of the corresponding drill bits 56 into the wall of the corrugated tube will be a certain predetemined amount less than the length of the conical working ends 56a of the drill bits. The conical form of the working ends of the drill bits 56 also facilitates the ingress and egress of each successive orbiting drill bit relative to the tube T without the sides of the drill bits cutting into the two adjacent ribs 35 straddling each interrupted rib 37. Proper adjustment of the cuff members 57d on piston rods 57c further insures than the straddling ribs 35 adjacent each interrupted rib 37 will not be damaged by the drill bits 56.

As heretofore indicated, the primary positive feed means for the tube T is part of the turret drill heads 51–53. To this end, each turret casing 52a has a plurality of circularly spaced radially projecting toothed segments 52p thereon which are arranged in alternation with the drill bits 56; i.e., there is one of the toothed segments 52p disposed between each adjacent pair of drill bits 56 of each turret drill head 51–53. The toothed segments 52p are suitably secured to the corresponding turret casings 52a, as best shown in FIG. 3, and the outer surfaces of the teeth of all the segments 52p associated with each turret drill head 51-53 are positioned a like distance from the rotational axis of the corresponding turret casing 52a.

However, the conical pointed working ends 56a of the drill bits 56 project radially outwardly a predetermined distance beyond the toothed segments 52p so that the drill bits 56 will properly form the desired holes in tube T. The circular pitch, shape and size of the teeth of each segment 52p are such that each successive segment 52p will meshingly engage the corrugations of tube T and cooperate in positively feeding tube T through drilling machine 50 as the adjacent drill bits 56 move forwardly into and then out of drilling engagement with tube T. The proximity of toothed segments 52p to drill bits 56 aids in properly positioning the desired ribs; ribs 37 in this instance, in proper alignment with successive drill bits 56.

Since it is desirable that the drilled holes 38a–38c are formed in the respective plateaus 37a–37c of each successive interrupted rib 37 in tube T (FIGS. 4 and 5), it is apparent that the center-to-center distance between the pointed free ends of adjacent drill bits 56 should be about the same as the distance between adjacent interrupted ribs 37 of tube T. Of course, the operative positions of the turret drill heads 51–53 may be adjusted in the manner heretofore described in order to obtain proper registration of the successive drill bits with the plateaus of successive interrupted ribs 37.

From the foregoing description, and with particular reference to FIGS. 3, 10 and 13, it is apparent that the three drill heads 51–53 are laterally and angularly offset relative to each other with respect to the predetermined path of travel of tube T through drilling machine 50, and that drill head 52 is spaced forwardly or downstream of drill heads 51, 52. More particularly, because of the arrangement of plateaus 37a–37c (FIG. 5) it is preferred that the median angular planes of the two rear or outer drill heads 51, 53 are such that any drill bit 56 of drill head 51 which occupies a position of its greatest penetration of tube T will have its axis extending at an angle of about 120° relative to the axis of any drill bit 56 of drill head 53 which then occupies its position of greatest penetration into tube T. Of course, the median angular plane of drill head 52, transversely of the rotational axis of its casing 52a; substantially bisects the median angular planes of the two drill heads 51, 53 relative to the axis of tube T in its path of travel through drilling machine 50. Additionally, the casing axis of front drill head 52 is substantially vertical and is spaced forwardly of the planes of the orbital axes of the casings of drill heads 51, 53 for a distance equal to or preferably a multiple of the distance between the centers of adjacent interrupted ribs 37 in tube T.

It is also preferred that the three drill heads 51–53 are arranged in the manner described so that the large majority of the shavings and other residue produced by the drilling of the holes 38a–38c in the plateaus 37a–37c of tube T will fall away from the tube instead of falling into the tube. Also, such residue falls away from the turret drill heads, to some extent, so that the residue does not interfere with the operation of drilling machine 50.

Suitable back-up means in the form of peripherally concave rollers 58 (FIGS. 12 and 13) are provided for engaging the outer surface of tube T and stabilizing the same at points substantially diametrically opposite from the points of deepest penetration of the drill bits 56 of drill heads 51–53 into tube T. Each of the stabilizing rollers 58 is journaled in a suitable bracket 58a which extends forwardly (FIGS. 12 and 13) and is suitably secured to front wall 50d of main housing H.

To aid further in stabilizing tube T against excessive lateral or vertical displacement out of its desired substantially straight path in its course through drilling machine 50, tubular guide members 50g, 50h (FIGS. 8, 10, and 12) are suitably secured to and extend forwardly from the respective rear and front walls 50b, 50d of main housing H. Tubular guide members 50g, 50h are aligned with suitable openings provided in the walls 50b, 50d and are of such internal diameter as to encirclingly restrict tube T against excessive lateral displacement during its travel therethrough and through drilling machine 50. The front end of rear tubular guide member 50g is spaced rearwardly from the front wall 50d of main housing H a sufficient distance so that it will not interfere with the operation of turret drill heads 51–53.

From the foregoing description, it is apparent that the motors 56k, when energized, rotate the drill bits 56 of the respective drill heads 51–53 continuously during operation of the drilling machine. Also, since the speed of electric motor 50a (FIG. 10) is controlled by the feed control device 40 so that the speed is varied in accordance with variations in tension in the corrugated tube T as it is being delivered by the blow molding machine 30, it can be appreciated that the gear segments 52p (FIG. 3) are rotated about the axes of the three respective turret drill heads 51–53 at such speed as to positively feed the tube T forwardly through drilling machine 50 at a speed corresponding to the speed at which tube T is being delivered by molding machine 30.

Also, the fact that there normally is at least one of the gear segments 52p of each drill head 50–53 meshingly engaging the corrugations of tube T at any given instant during operation of the apparatus, it follows that the gear segments 52p insure that the desired number of uninterrupted ribs 35 is moved past each drill head between those intervals of movement of successive drill bits 56 into drilling engagement with tube T. This insures that holes will be drilled in the interrupted ribs 37 only. Of course, the relative angular positions of the median diametral or transverse planes of turret drill heads 51–53 insures that the holes 38a–38c will be drilled in only the respective plateaus or recessed surfaces 37a–37c of the successive interrupted ribs 37.

Since the turret drill heads 51–53 are adjusted inwardly and outwardly to determine their operative positions when the piston rods 57c are extended as shown in FIG. 13 by adjusting the cuff members 57d thereon, there may be instances when the toothed segments 52p of one or more of the turret drill heads 51–53 may not be in full meshing engagement with the corrugated tube T or may slip past a rib on tube T. Therefore, the secondary positive feed device 54 is provided to further insure that the corrugated tube is fed through the drilling machine 50 and fed through cutting station 60 and also to insure that the drilled tube is withdrawn from housing H without being compressively shortened as a result of the tube moving in sliding engagement with the front tubular guide member 50h.

Accordingly, as shown in FIGS. 3, 8, 10 and 12, the secondary positive tube feed mechanism 54 includes a pair of rotatable feed members, both of which are shown in the form of spur or feed gears 54b, 54c. In this instance, feed gears 54b, 54c are mounted above and below, respectively, the path of travel of tube T through the front tubular guide member 50h. The peripheral teeth on gears 54b, 54c are shaped so as to meshingly engage tube T as it is passing through front tubular guide member 50h. Accordingly, tubular guide member 50h has upper and lower substantially diametrically opposed slots 50i therein to accommodate gears 54b, 54c.

As best shown in FIG. 10, feed gears 54b, 54c are fixed on corresponding ends of respective shafts 54d, 54e which extend transversely of the path of travel of tube T. In this instance, as shown in FIG. 10, shafts 54d, 54e are the output shafts of a gear box 54f mounted in auxiliary housing A. Input shafts 54g, 54h of gear box 54f are connected to the output shafts 54d, 54c by suitable gearing, not shown, to cause the feed gears 54b, 54c to rotate forwardly or in the direction indicated by the arrows in FIGS. 8 and 12. Motor 50a is drivingly connected to the input shafts 54g, 54h of gear box 54f by suitable belt and pulley connections generally designated at 54i.

As heretofore stated, the main drive shaft 55 for rotating turret drill heads 51-53 about their respective axes is driven by suitable connections with the electric motor 50a. To this end, it will be observed in FIGS. 10 and 12 that the input shaft 54a of gear box 55b has a sprocket wheel 54j fixed thereon and engaged by an endless sprocket chain 54k. Sprocket chain 54k also engages a sprocket wheel 54m fixed on the upper output shaft 54d of gear box 54f, thus driving shaft 55 at a speed directly proportional to the speed of the feed gears 54b, 54c at all times during operation of the apparatus.

As indicated earlier herein, when the corrugated plastic tube produced in accordance with this invention is installed, the centermost longitudinal row of drainage holes 38b therein (FIGS. 4 and 5) should be positioned lowermost in the ground so that the back-fill material used for covering the tube will not enter the tube or clog the holes 38a-38c therein. To visually aid the workmen in properly positioning the tube in a ditch, a "sight" line S of any suitable marking material is provided along the length of the tube diametrically opposite from the centermost drainage holes 38b, as shown in FIGS. 4 and 11. Conveniently, the sight line S is formed on the tube T as it emerges from the drilling machine 50.

Accordingly, it will be observed in FIG. 11 that a sight line forming means 80 is positioned adjacent the egress end of drilling machine 50 and comprises a suitable painting or marking member or tip 80a which is preferably formed of felt or other yieldable wick material which will permit the tube I to slide thereagainst as the liquid marking substance or liquid is transferred from the marking tip to the outer peripheral surfaces of the ribs 35, 37 of tube T. As shown, the marking member 80a is received in a tubular fixture 80b suitably secured to one side of the front end portion of front tubular guide member 50h. Fixture 80b has a tube 80c connected thereto and extending upwardly to a suitable source of liquid marking material shown in the form of an open-bottomed container 80d to which the upper end of tube 80c is communicatively connected.

Container 80d may be supported in a suitable bracket 80e fastened to the auxiliary housing A. The tubular fixture 80b and the marking tip 80a are so positioned that the liquid marking material gravitating from the container 80d to the tip 80a will be applied to the forwardly moving tube T substantially diametrically opposite from the row of holes 38b formed in the tube by the drill bits 56 of the turret drill head 52.

It is thus seen that I have provided an improved method and apparatus for drilling longitudinal rows of substantially uniformly spaced holes in a forwardly moving tube, and which method and apparatus are especially adapted for use in the production line for a plastic corrugated tube. It can be appreciated that the present invention facilitates obtaining a highly efficient and high rate of production of a corrugated plastic tube with a longitudinal row or rows of drilled holes therein since, as the tube is being continuously extruded and molded in the desired corrugated form by the extruding machine 20 and the blow molding machine 30, respectively, the holes are drilled in the tube as it is being fed through the drilling station 50 downstream of the molding machine 30 without interrupting or retarding the forward movement of the plastic corrugated tube.

Although the drilling machine 50 is described as being especially useful for drilling holes in a plastic corrugated tube, it is to be understood that the principles embodied in the drilling machine are useful for drilling other forms of elongate members such as smooth plastic tubes, for example.

In the drawings and specification there has been set forth a preferred embodiment of the invention and, although specific terms are employed they are used in a generic and descriptive sense only and not for purposes of limitation.

That which is claimed is:

1. Apparatus adaptable for forming holes in a corrugated tube; said apparatus comprising guide means adapted for guiding the corrugated tube forwardly in a predetermined path of travel, a plurality of spaced rotatable turret casings adjacent said guide means, said turret casings being angularly offset from each other about the path of travel of the tube, at least one of said casings being located downstream of another of said casings, a series of rotatable drill bits carried by and projecting outwardly from each respective casing and into the path of travel of the tube and adapted to drill respective holes in the tube, means for rotating said turret casings, means for rotating said drill bits on their own axes, and motive means operatively connected to said turret casings and operable for moving said casings and the respective drill bits carried thereby outwardly to an inoperative position relative to the path of travel of the tube.

2. Apparatus according to claim 1, wherein said motive means operatively connected to said turret casings comprises fluid pressure means adapted for moving the turret casings and the respective drill bits carried thereby outwardly to an inoperative position relative to the path of travel of the tube.

3. Apparatus according to claim 2, wherein each of said drill bits has a conical free end with a cutting edge extending along the conical surface thereof, and said apparatus further comprising means operatively associated with said fluid pressure means for adjusting the position of said turret casings relative to the path of travel of the tube to vary the depth of penetration of the respective drill bits carried thereby so as to vary the size of the holes being formed in the tube.

4. Apparatus according to claim 3, wherein the cutting edge of each drill bit is substantially straight and extends in a direction generally corresponding to the length of the drill bit.

5. Apparatus according to claim 1, including means for advancing the corrugated tube in its path of travel comprising a plurality of projections carried by at least one of said turret casings and disposed between the respective drill bits, and said projections being adapted to engage and push forwardly against certain corrugations of the tube during rotation of the respective turret casing for advancing the corrugated tube in timed relation to the respective series of drill bits during the drilling of respective holes in the corrugated tube.

6. Apparatus according to claim 1, including means for advancing the corrugated tube along its path of travel comprising a driven rotatable feed member having peripheral projections thereon adapted to meshingly engage and push forwardly against certain corrugations of the tube.

7. Apparatus according to claim 6, including common drive means operatively connected to said rotatable feed member and to said means for rotating said turret casings for advancing the corrugated tube along its path of travel at a rate in accord with the rate of movement of said series of drill bits.

8. Apparatus according to claim 1, wherein said guide means includes means adjacent said turret casings for encirclingly restricting the corrugated tube against lateral displacment by said drill bits during the drilling of the corrugated tube.

9. Apparatus according to claim 1, including back-up means adapted to engage the side of the corrugated tube opposite from the respective turret casings for restricting lateral displacement of the tube by the drill bits of the respective series.

10. Apparatus adaptable for forming holes in a corrugated tube having corrugations of alternating ribs and valleys along its length; said apparatus comprising means for advancing the corrugated tube forwardly in a predetermined path of travel, means for driving said advancing means, first, second and third turret casings mounted for rotation on respective axes offset to one side of and extending substantially normal to the path of travel of the corrugated tube, a series of driven, rotatable drill bits projecting outwardly from each respective turret casing for movement therewith, the distance from the outer ends of said drill bits to the axes of the respective turret casings being greater than the distance from the path of the corrugated tube to the axes of said turret casings such that each series of drill bits will engage and drill successive holes in the corrugated tube during rotation of said turret casings on their respective axes, said first, second and third turret casings being disposed in relatively different angular positions about the path of travel of the tube so that the drill bits of each turret casing will engage and drill holes in the tube at a different angular position from that of the drill bits of the other turret casings, and means connected to said driving means for said advancing means and to said turret casings for also rotating said turret casings on their respective axes in accordance with the rate of advancement of the corrugated tube whereby the drill bits carried by said first, second and third turret casings will form three respective longitudinal rows of holes in the corrugated tube.

11. Apparatus according to claim 10, further comprising marking means adjacent said turret casings for engaging and applying a marking material along the length of the corrugated tube during advancement thereof in its path of travel, and said marking means being so positioned as to engage the tube substantially diametrically opposite from the row of holes formed by one of the series of drill bits.

12. Apparatus according to claim 10, wherein the axis of at least one of said turret casings is positioned adjacent a different portion of the path of travel of the corrugated tube than that portion adjacent which the axis of at least one of the other turret casings is positioned.

13. Apparatus adaptable for forming holes in a corrugated tube; said apparatus comprising guide means adapted for guiding the corrugated tube forwardly in a predetemined path of travel, a plurality of spaced rotatable turret casings adjacent said guide means, said turret casings being angularly offset from each other about the path of travel of the tube, at least one of said casings being located downstream of another of said casings, a series of rotatable drill bits carried by and projecting outwardly from each respective casing and into the path of travel of the tube and adapted to drill respective holes in the tube, means for rotating said turret casings, means for rotating said drill bits on their own axes, and marking means adjacent said turret casings for engaging and applying a marking material along the length of the corrugated tube during the advancement thereof in its path of travel, and said marking means being so positioned as to engage the tube on the side opposite from the holes formed by one of the series of drill bits.

* * * * *